United States Patent [19]
Birch

[11] 3,826,505
[45] July 30, 1974

[54] PICKUP GUIDANCE MECHANISMS

[76] Inventor: Richard Wykeham Beaufoy Birch, Strelley Barn, Woodham Mortimer, Maldon, Essex, England

[22] Filed: Mar. 22, 1972

[21] Appl. No.: 236,911

[30] Foreign Application Priority Data
Mar. 25, 1971 Great Britain ..................... 7821/71

[52] U.S. Cl. .............................................. 274/23 A
[51] Int. Cl. ............................................ G11b 3/38
[58] Field of Search .................................. 274/23 A

[56] References Cited
UNITED STATES PATENTS
3,059,934 10/1962 Urmeny .......................... 274/23 A OTHER PUBLICATIONS
The Servo Groove Tracker, Arthur G. Johnson Audio, May 1966, pp. 21, 22, 62.

*Primary Examiner*—Louis R. Prince
*Assistant Examiner*—Steven L. Stephan
*Attorney, Agent, or Firm*—Browdy & Neimark

[57] ABSTRACT

A pickup guidance mechanism for gramophone disc records comprises a first arm on which the pickup is carried and which is pivoted for rotation in a plane parallel to the record, a second arm pivoted for rotation in a plane parallel to the record and which carries the pivot of the first arm, sensing means adapted to produce a command signal when the first arm departs from a mean position in which the angle in the plane containing the record subtended at the first arm rotation axis by the pickup stylus and the second arm rotation axis is of a desired magnitude uniquely related to the distance at the time between the stylus and the record center, and correcting means responsive to said command signal, adapted to effect movement of the first arm towards its mean position.

6 Claims, 6 Drawing Figures

PICKUP GUIDANCE MECHANISMS

This invention relates to pick-up guidance mechanisms.

In a stereophonic gramophone pick-up, the stylus can make small movements in two directions at right angles, and these movements can be deemed to occur in a certain plane, herein called the "excursion plane," which lies, commonly, at an angle of about 75° to the plane of the record. The intersection of the excursion plane and the record plane is herein called the "excursion line." Pick-ups are, commonly, symmetrical in construction about a plane at right angles to the excursion plane and the record plane. This plane is herein called the "symmetry plane," and its intersection with the record plane is herein called the "symmetry line."

For best audio reproduction, the pick-up requires to be guided so that the excursion line passes through the record rotation axis. Commonly, however, this situation is not achieved. The angle at any time between the excursion line and the record radius passing through the stylus is called the tracking error angle.

In the case of conventional pick-up arms, the arm is mounted, for rotation in a plane parallel to the record, on a pivot which is fixed relative to the baseboard of the apparatus, the pivot is made as nearly free from friction as possible, and the arm is shaped for minimizing tracking error, in consequence of which, the symmetry plane passes at a considerable distance from the pivot axis. For example, this distance is about 9 cm. in the case of a conventional arm with a length of 20 cm. from stylus to pivot. Thus, the frictional drag force between stylus and record, being directed tangentially to the record groove, has a considerable turning moment about the pivot. This turning moment is resisted by a force at the stylus and, if tracking error is zero at the time, this force is directed along the excursion line. If tracking error is small but not zero, the force acts at only a small inclination to the excursion line.

A force in the plane of the record, acting at the stylus along the excursion line, is called side-pressure, and the particular form of side-pressure resulting as described from the shaping of conventional arms for minimum tracking error is herein called "geometric" side-pressure. Any side-pressure is harmful to audio reproduction, because the mean position about which the stylus vibrates in response to groove modulation is, contrary to the intended mode of operation, displaced from the rest-position of the stylus.

If the arm is shaped so that the symmetry plane contains the pivot axis, the tangential drag force can cause no side-pressure, since, if the pivot is frictionless, the equilibrating force can act only in the direction from stylus to pivot. An arm so shaped is herein called a "straight" arm. It is clear therefore, that with a straight arm and a frictionless pivot, geometric side-pressure is zero whether tracking error is zero or not.

The objects of the invention are, first, the complete or nearly complete elimination of geometric side-pressure and, second, the simultaneous reduction of tracking error. The first aim is achieved by the use of a straight arm, and the second object is assisted by powered means, described later, for moving the arm pivot relative to the baseboard of the apparatus.

In the present invention tracking error is ideally to be eliminated completely.

The present invention consists in a pick-up guidance mechanism for gramophone disc records comprising: a pickup which can receive a stylus for engaging a groove on a record; a first arm on which the pick-up is carried for guidance across the record, and pivoted, for rotation in a plane parallel to the record, about an axis which lies in the symmetry plane; a second arm, pivoted, for rotation in a plane parallel to the record, about an axis which is fixed relative to the baseboard of the apparatus, and carrying the pivot of said first arm, sensing means, adapted to produce a command signal when said first arm departs from a mean position in which the angle in the plane containing the record subtended at said first arm rotation axis by respectively the stylus and said second arm rotation axis is of a desired magnitude uniquely related to the distance at the time between the stylus and the record centre, and correcting means, responsive to said command signal, adapted to effect movement of said first arm towards said mean position.

The relation between said subtended angle and the distance between the stylus and the record center is that said subtended angle is three right angles less the sum of the angle subtended at said second arm rotation axis by the rotation axes of respectively the record and said first arm, and the angle subtended at the record rotation axis by the stylus and said second arm rotation axis. This relationship arises because the three angles specified are contained within a quadrilateral, the fourth angle of which is that subtended at the stylus by the record and first arm rotation axes and requires to be a right angle for zero tracking error.

Preferably, said sensing means operate without any bodily contact or reaction with, or any magnetic or other influence upon, said first arm and include a source of radiation and a detector of that radiation.

The invention will now be described, by way of example, with reference to the accompanying drawings, in which.

In a known mechanism, the angle subtended at the pick-up arm rotation axis by the stylus and the slave arm rotation axis is, ideally, kept constant by action of electric contacts in circuit with an electric motor that rotates the slave arm. Assuming for the moment that this angle is kept truly constant, the two arms combine in a configuration equivalent to a conventional arm. For example, (see FIG. 1), a pick-up arm SP with stylus at S and pivot at P, together with a slave arm PC pivoted at C and carrying the pivot P of arm SP, the angles CPS and CSP being constant angles $\theta$ and $\phi$, give the configuration of a conventional arm SC (see FIG. 2), with stylus at S, pivot at C, offset angle $\phi$, and a length L from S to C equal to the length L of FIG. 1. Hence, whatever limitation of tracking error is obtainable from the conventional arm SC is equally obtainable from the combination of arms SP and PC. This limitation is obtainable in addition to the complete or nearly complete elimination of geometric side-pressure.

Figure 1:
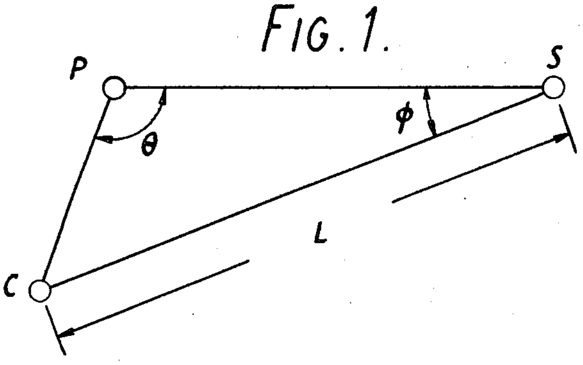
FIG. 1 is a drawing illustrating the basic geometry of the present invention.
Figure 2:
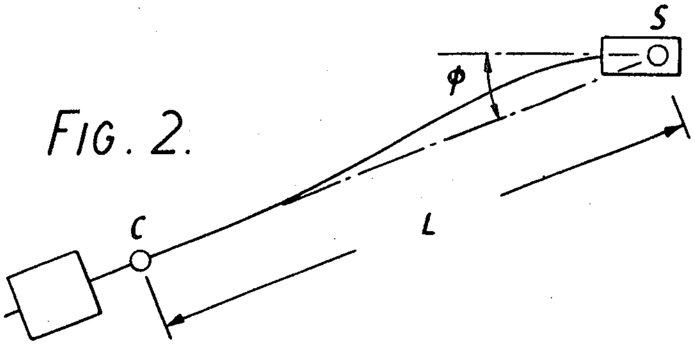
FIG. 2 is a diagrammatic plan view of a conventional pick-up arm with offset angle $\phi$.
Figure 3:
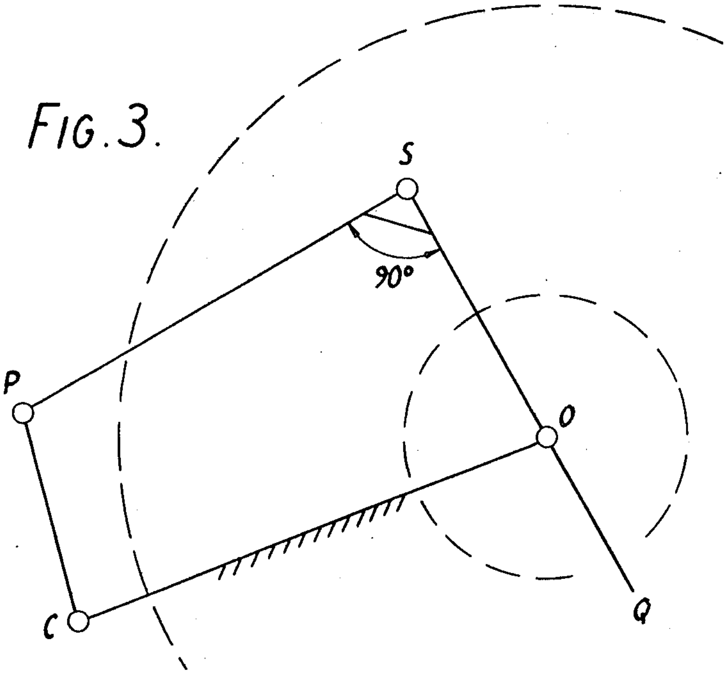
FIG. 3 is a diagram illustrating some of the geometry of the present invention.

With reference to FIG. 3, it can be seen that during a playing of a record centered at 0 with zero tracking error, the arms CP and PS of FIG. 1 are kinematically equivalent to a fixed member CO, a bar CP hinged at C, and a bar PSQ hinged at P and having the angle PSQ a right angle, while portion SQ is constrained to pass through O. Thus, for any one value of the distance SO during a playing, there is one and only one value of angle CPS, and the sum of angles SOC, OCP and CPS is three right angles.

Preferred embodiments of the present invention include alignment means, having in broad terms the nature of a cam-and-follower device, whereby the desired size of angle CPS for any particular value of distance SO can be bodily manifested, and said sensing means are applied for comparing, throughout a playing, the actual with the manifested desired value of angle CPS. Here can be seen the basis of automatic correction whereby maintenance of angle CPS at always its desired size ensures the traverse of a record with zero tracking error. Thus in Class B embodiments the complete or nearly complete elimination of geometric side-pressure is combined with the complete or nearly complete elimination of tracking error.

Figure 4A:
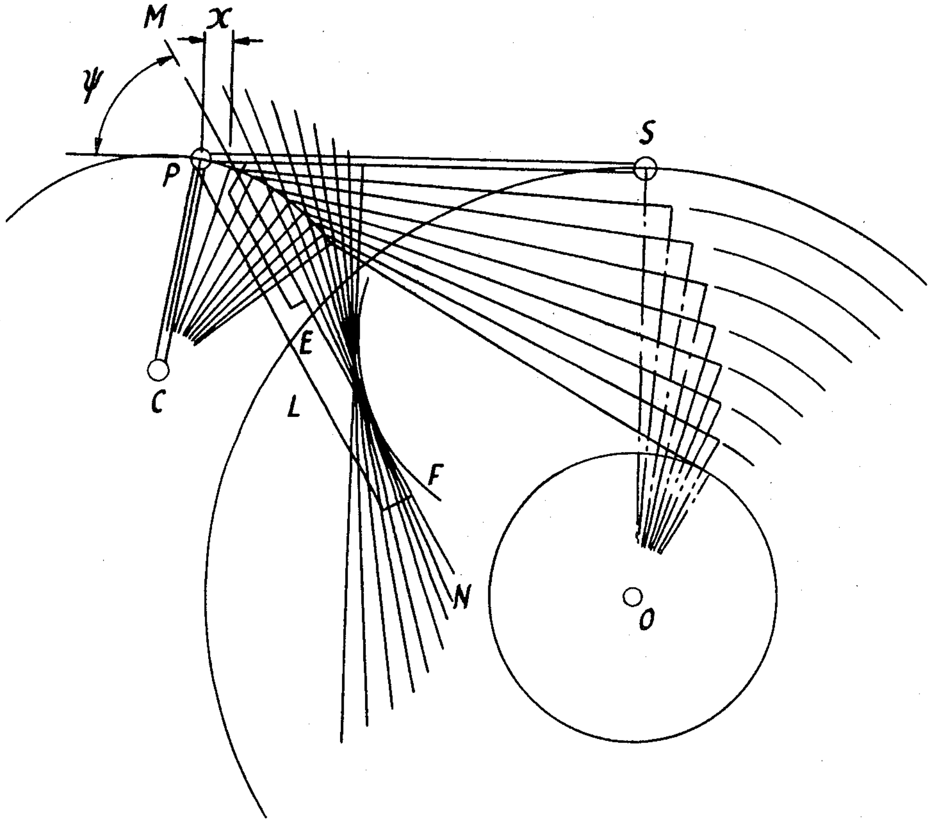
FIG. 4A is a diagram illustrating the geometry of a specific embodiment of the present invention.
Figure 4B:
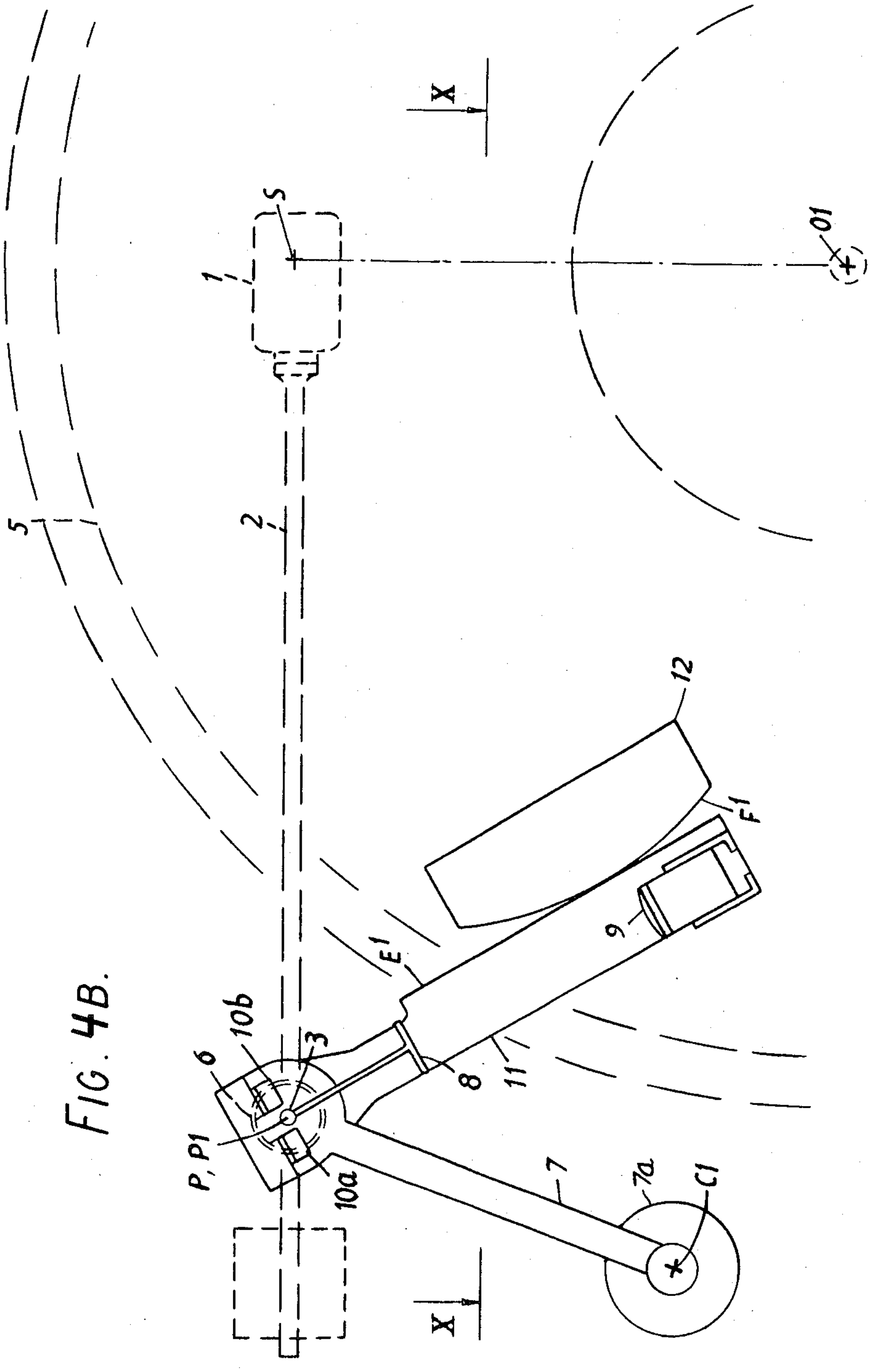
FIG. 4B is a plan view of parts of an embodiment of the present invention lying below the baseboard of the apparatus.
Figure 4C:
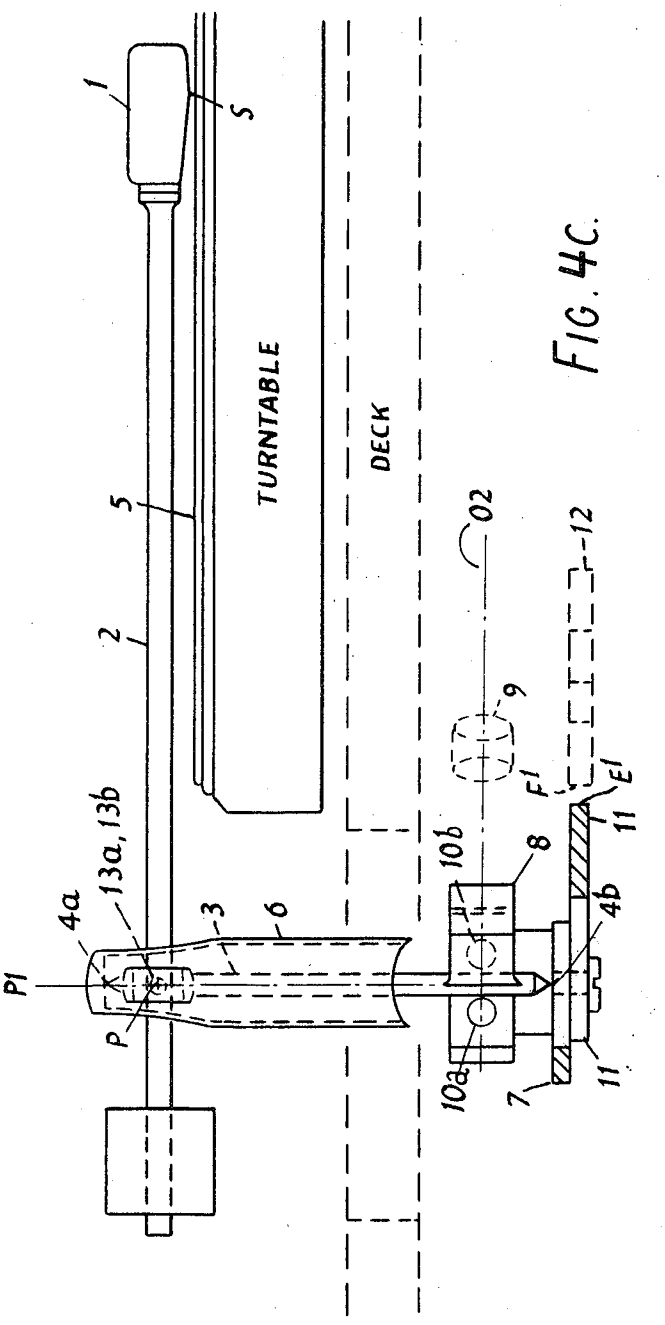
FIG. 4C is a sectional view taken on the line X—X of FIG. 5B.

FIGS. 4A, 4B and 4C illustrate a preferred embodiment of the present invention. FIG. 4A shows the geometry in diagrammatic form. Here, a pick-up arm SP, with stylus at S and pivot at P, is rigidly attached to a member PL having a portion, E, of its edge lying along a straight line MN which is fixed relative to arm SP. A slave arm CP is pivoted at C and carries pivot P of the pick-up arm. The Figure, by showing several positions of arm SP in a traverse with zero tracking error across a record centered at O, indicates the generation by edge E of a geometrical envelope, here shown as curve F. Clearly, a wide variety of envelopes can be generated, according to the chosen distance x from P, and angle $\psi$, at which line MN intersects line SP.

An embodiment shown in FIGS. 4B and 4C employs such an envelope as the basis of sensing means. Here, pick-up 1 with stylus S is carried on pick-up arm 2. At axis $P_1$ of pick-up arm rotation is stem 3 providing spaced pivots 4*a*, 4*b*, for rotation parallel to record 5, the pivots being carried in pillar 6 which is rigidly attached to slave arm 7 which is rotatable through motor 7. Attached to stem 3 is optical shutter 8, placed so that when tracking error is zero or small, it lies in the path of light from lamp 9 to photocells 10*a*, 10*b*. The shutter 8, lamp 9 and photocells 10*a*, 10*b*, are placed symmetrically about a plane 02 parallel to the record, this plane being the sensing plane. The lamp and photocells are fixed on arm 11, called the optical arm, which is pivoted for rotation, independently of the pick-up arm and slave arm, about axis P1. An edge $E^1$ of arm 11 is maintained, for example, by spring means or gravity means or magnetic means (not shown), in sliding contact with cam 12 which is fixed relative to the baseboard of the apparatus and has its operative edge shaped to curve $F^1$.

For rotation at right angles to the record, arm 2 is provided with spaced pivots 13*a*, 13*b*, in an upper part of stem 3 in a gymbal arrangement. Slave arm 7 is pivoted for rotation about axis C1 which is parallel to axis P1 and is fixed relative to the baseboard. Electrical conductors serving the lamp and photocells pass from the slave arm to the fixed parts of the apparatus and do not interfere with freedom of rotation of stem 3. The position at which shutter 8 is attached to stem 3 is chosen so that at times of zero tracking error the cells 10a, 10b, receive equal illumination, giving optically and electrically a null or balance condition. If, while the slave arm is momentarily at rest, the stylus travels across the record, the balanced condition is upset and, in response to unequal illumination of the cells, an electrical signal is passed to servo circuitry, described later, whereby through a rotary reversible electric motor 7a, rotation of the slave arm is caused in a direction tending to restore the balanced condition in which tracking error is zero. This is an example of correction of leading tracking error, corresponding to increased illumination of cell 10a and decreased illumination of cell 10b. The converse error, or lagging error, can occur with a swinger record, that is to say, a record in which the geometrical center of the groove spiral is displaced from the record rotation axis, or when the pick-up arm is manually returned to its park position after a playing.

With this arrangement it is evident that provided that arm edge $E^1$ and cam edge $F^1$ are related to one another as are the line E and curve F of FIG. 4A, then if, by operation of sensing means, servo circuitry and correcting means all as described hereinbelow, the angle in the record plane between the orthogonal projections thereon of respectively the line PS and the edge $E^1$ is maintained constant at a desired magnitude during a playing, the pick-up will traverse the record with zero cracking error.

The servo circuitry, briefly described, is supplied with external power and operates as a control system of known closed-loop type, includes elements for proportional response to input signal and for power amplification, produces, for driving a rotary reversible electric motor, an output whereby the direction, amount, and speed of rotation of said motor are made suitable for the correction of error taking into account the speed at which tracking error would, in the absence of control, accumulate in the playing of ordinary records including swingers, and can if desired include elements for response to rate of change of input signal and elements for phase change.

The servo motor, driven by said circuitry output, rotates the slave arm through ordinary reduction gearing and an ordinary slipping device which permits manual rotation of the slave arm without harm to the motor or gearing. The drive between motor and gearing may if desired be biased, for example by spring means or gravity means, to overcome mechanical backlash.

In this embodiment, when tracking error of a certain amount in either sense occurs, causing full illumination of one cell and full shadowing of the other, maximum electrical command is yielded by the cells and continues thus at larger amounts of tracking error. This feature, herein called "wide duple capture," is useful when the pick-up arm can be handled by the user. Quick movement of the pick-up arm when raised from the record can cause gross departure from the described mean position, and the inclusion of wide duple capture ensures correction of such departure at the maximum speed of which the control system is capable.

The amount of departure at which one cell is just fully shadowed can be widely varied according to the chosen lengths of the stem and head of the shutter 8, in particular, this amount can be slightly less than the amount likely to occur in the playing of ordinary records including swingers and those in which a portion of groove at coarse pitch separates modulated bands at ordinary pitch. Then, during a playing, the command to the servo circuitry is less than maximum and the control system operates always in the range in which proportional response can be obtained. For convenience, error and correction in this range are called "fine" error and correction, denoting a range in which proportional control and time-integrating control are desirable features, while "coarse" error and "coarse" correction denote a range in which a simpler control suffices, for example, correction at a constant high speed until the error becomes fine.

This arrangement is suitable with an autochanger machine. Here, the speed of automatic movement of the pick-up arm when disengaged from the record can be suited to the pursuit capability of the control system so that gross departure does not occur. Thus the departure occurring when the stylus enters the lead-out groove, that is to say, the portion of groove at suddenly increased pitch leading to the closed finishing-groove, can be the maximum departure in the whole cycle of operation and can be made to actuate not the correcting mechanism but the autochange operation of raising the arm from the record.

In embodiments including a stem such as the stem 3 of FIG. 4B, pivoted for rotation about a vertical axis only, warp in a record causes no vertical movement of any sensing element and does not affect performance of the sensing means.

A sensing method by which, at a certain amount of tracking error, some parts of photocells are illuminated and other parts shadowed can be replaced by a converse method in which the illuminated parts are shadowed and vice versa, and in which connections in the servo circuitry are appropriately altered. For example, general light passing the shutter of FIG. 4B can be excluded by a mask enclosing the photocells and having an aperture admitting light interrupted by the shutter.

In this embodiment the sensing plane lies below the record plane and the sensing means can, therefore, be accommodated in the height required for the turntable motor without adding to the height required above the turntable and are screened from ambient light by being enclosed in the customary box holding the apparatus. In this embodiment, also, the lamp and photocells are mounted at a fixed distance apart and the angle of incidence of light on the photocells is constant: these features assist accurate sensing in combination with easy manufacture. Also electrical conductors serving the sensing means do not interfere with freedom of rotation of the pickup arm.

A particular case of cam-and-follower geometry deserves mention. It is possible to choose values for the distance $x$ and the angle $\psi$ of FIG. 4A such that line MN, in all positions in its operative range, passes through or very nearly through a fixed point. Thus, with reference to FIG. 4B, the arm 11 can have, instead of an edge $E^1$, a rod lying concentrically along the chosen line MN, and this rod can slide through a hole in a disc or boss rotatable about an axis passing through said fixed point and lying at right angles to the baseboard. With such an arrangement, traverse of the pick-up with zero or with very small tracking error is obtained without the need for the shaping of any surface to a particular cam profile.

The preferred embodiment employs visible light in its sensing means, but as regards generality of the invention it is not to be inferred that visible light is the only applicable radiation. Other radiations, for example electromagnetic radiation of frequencies outside the range of visible light, or molecular vibration in the air, can be employed. Infra-red radiation and ultrasonic vibration may be utilized; techniques for employing either of these for transmission of information are well established.

The sensing means, instead of employing radiation, may be more direct in nature: for example, relative movement of two members of an embodiment at which error is sensed, may actuate direct electrical switching by the opening and closing of contacts mounted on the respective parts. In this case, pressure between the closed contacts will cause some side-pressure at the stylus, but the side-pressure can be kept small by choosing contactor members of a light springy nature. An enclosed mercury switch, for example, one in which switching is obtained by tilting, can also be suitable if switching can be got from only small force. As another example, an enclosed reed switch mounted on one of said members may be actuated by a magnet mounted on the other, and by proper choice of shape and size of magnet and of materials placed within its field, side-pressure arising from switching action may be kept small. With sensing means employing radiation as described, occurrence of tracking error causes a servo circuitry input of essentially a modulated nature, while with sensing means employing switching, said input is essentially of a two-state or on-off nature. It is to be noted however that by including in the servo circuitry elements for time-integration of input signal, the electrical supply to the servo motor can be of a modulated nature and therefore, even without considering mechanical inertia of moving parts, switching at the input need not cause jerkiness of the mechanical correction of error.

For the minimizing of side-pressure other than geometric side-pressure, it is desirable that friction and constraint at the pivot of the pick-up arm should be the least possible, but this feature is not necessary at the slave arm pivot since this arm is powered. Nor, in the preferred embodiment, is it necessary to minimise friction in the pivoting or sliding of the optical arm, since the external power supplied to the slave arm is available to overcome any resistance to that pivoting or sliding. Hence, by care in the design at the pivot of the pick-up arm such as would be applied to the design at the pivot of a conventional arm, the same success in the minimising of side-pressure other than geometric side-pressure can be achieved as with a conventional arm, and the resultant side-pressure from all causes is greatly reduced in a guidance mechanism according to the invention, compared with that in a conventional arm.

I claim:

1. A pick-up guidance mechanism for guiding a stylus in engagement with a groove on a gramophone disc record, comprising:

a pick-up adapted to receive the stylus;

a straight arm carrying said pick-up for guidance across the record without geometric side pressure acting on the stylus and pivoted about an axis for rotation in a plane parallel to the record;

a slave arm pivoted for rotation in a plane parallel to the record about an axis which is fixed, said slave arm carrying the pivot of said straight arm;

a further arm mounted for rotation about the axis of said straight arm in a plane parallel with the record;

fixed abutment means positioned such that the further arm engages said abutment means as the stylus traverse across a record;

sensing means for producing a command signal upon there being an angle between the straight arm and the further arm other than a predetermined angle;

correcting means responsive to said command signal for effecting relative pivotal movement between the straight arm and the further arm to restore said predetermined angle therebetween.

2. A mechanism as claimed in claim 1, wherein said further arm is disposed, to extend towards the record within the angle formed between said straight arm and said slave arm.

3. A mechanism as claimed in claim 1, wherein said fixed abutment means comprises a cam surface shaped to preserve a right angle between said straight arm and the radius of the record extending to the stylus during operative traverse of the stylus across the record when said predetermined angle is maintained there being provided biasing means for maintaining engagement between the further arm and the cam surface.

4. A mechanism as claimed in claim 1, wherein said sensing means comprises a source of radiation and radiation detector means towards which the radiation path from the source is directed, the source and the detector means being mounted in relation to said further arm and said straight arm to cause during operative traverse of the stylus across a record radiation incident upon the detector means in an amount dependent upon the relative positions of the straight arm and the further arm.

5. A mechanism as claimed in claim 4, wherein said radiation source and said detector means are mounted on said further arm and a shutter mounted for rotation with said straight arm is provided and extends between said source and said detector means and serves to intercept radiation from the source to an extent dependent upon the relative positions of said straight arm and said further arm.

6. A mechanism as claimed in claim 5, wherein said radiation source is a light source mounted on said further arm and directed towards the rotational axis of said straight arm and said detector means are two photoelectric cells mounted for rotation with said further arm and disposed on respective opposite sides of and adjacent the axis of rotation of said straight and further arms, and said shutter is interposed between the light source and the photoelectric cells and mounted for rotation with said straight arm so that, upon departure of said straight arm in one sense from the position in which said predetermined angle is present between said straight arm and said further arm, increased incidence of radiation on one cell takes place with corresponding reduced incidence of radiation on the other cell whilst departure of said straight arm in a sense opposite said one sense effects reduced incidence of radiation on said one cell with corresponding increased incidence of radiation on said other cell.

* * * * *